United States Patent [19]

Häfner

[11] Patent Number: 4,682,915

[45] Date of Patent: Jul. 28, 1987

[54] METHOD AND APPARATUS FOR CONTINUOUS GRAVIMETRIC METERING AND PNEUMATIC FEEDING OF POURABLE MATERIAL

[75] Inventor: Hans W. Häfner, Aichach Walchshofen, Fed. Rep. of Germany

[73] Assignee: Pfister GmbH, Augsburg, Fed. Rep. of Germany

[21] Appl. No.: 811,075

[22] Filed: Dec. 19, 1985

[30] Foreign Application Priority Data

Jun. 7, 1985 [DE] Fed. Rep. of Germany ....... 3520551

[51] Int. Cl.⁴ .............................................. B65G 53/66
[52] U.S. Cl. ........................................ 406/31; 177/59; 177/255; 406/63
[58] Field of Search ................ 406/31, 32, 62, 68; 222/636, 148, 216; 177/255, 59

[56] References Cited

U.S. PATENT DOCUMENTS 4,528,848 7/1985 Hafner ................................. 406/63

FOREIGN PATENT DOCUMENTS 3217406 11/1983 Fed. Rep. of Germany .

Primary Examiner—Jeffrey V. Nase
Attorney, Agent, or Firm—Armstrong, Nikaido, Marmelstein & Kubovcik

[57] ABSTRACT

A method for operating an apparatus including a rotor provided with laterally closed feeding pockets and tightly arranged in a housing for rotation. The housing is provided with a charging station and a discharging station and is hinged for pivotal movement. A force measuring unit is connected to the housing. The momentary load caused by material contained in feeding pockets of the rotor is measured while rotating from the charging station to the discharging station. The measured momentary load is used for controlling the amount of material to be fed and variations in measured values caused by mechanical and/or thermic influences are compensated.

28 Claims, 17 Drawing Figures

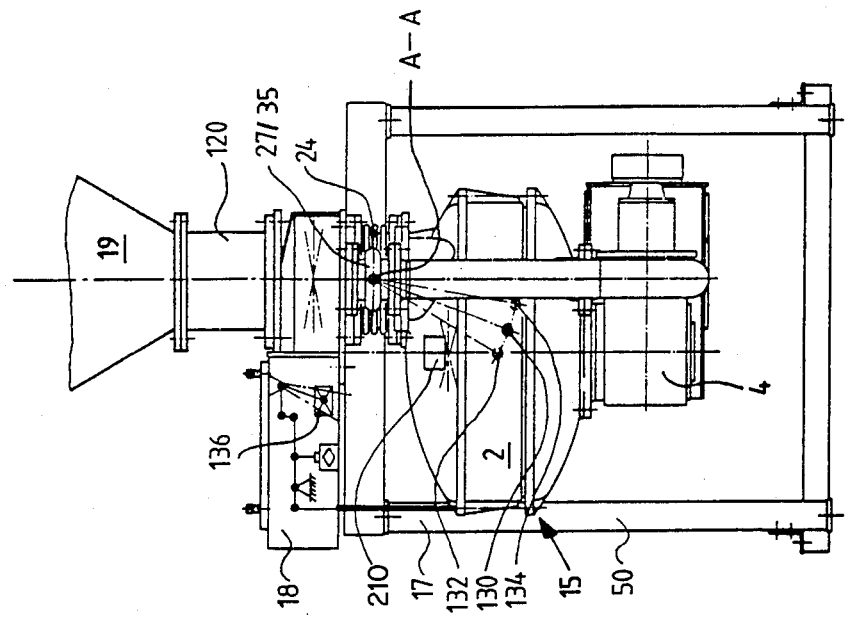
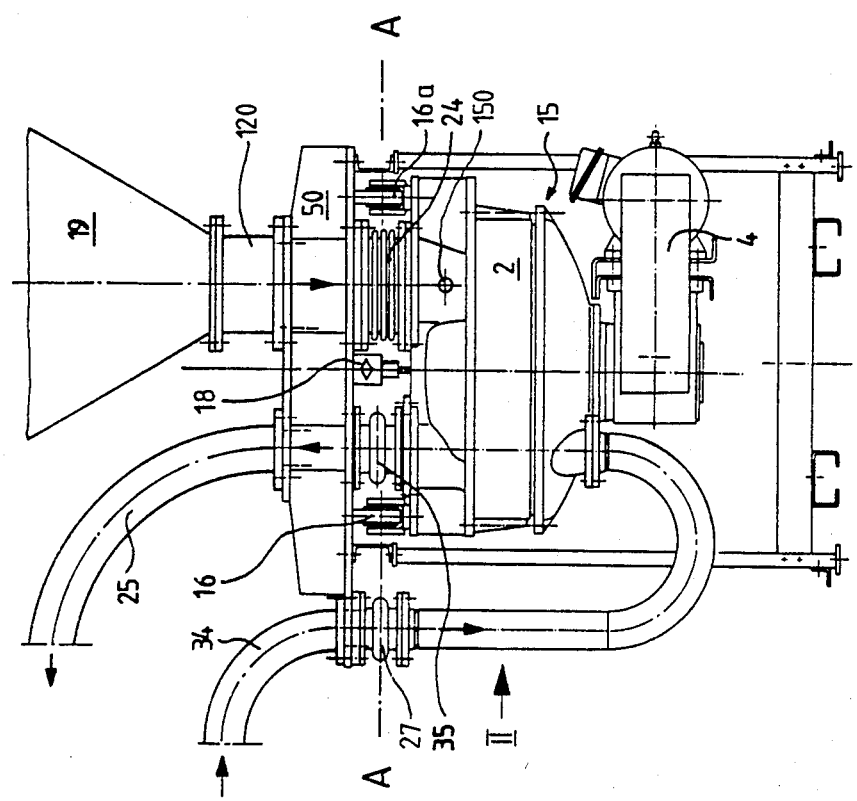
Fig. 1
Fig. 2

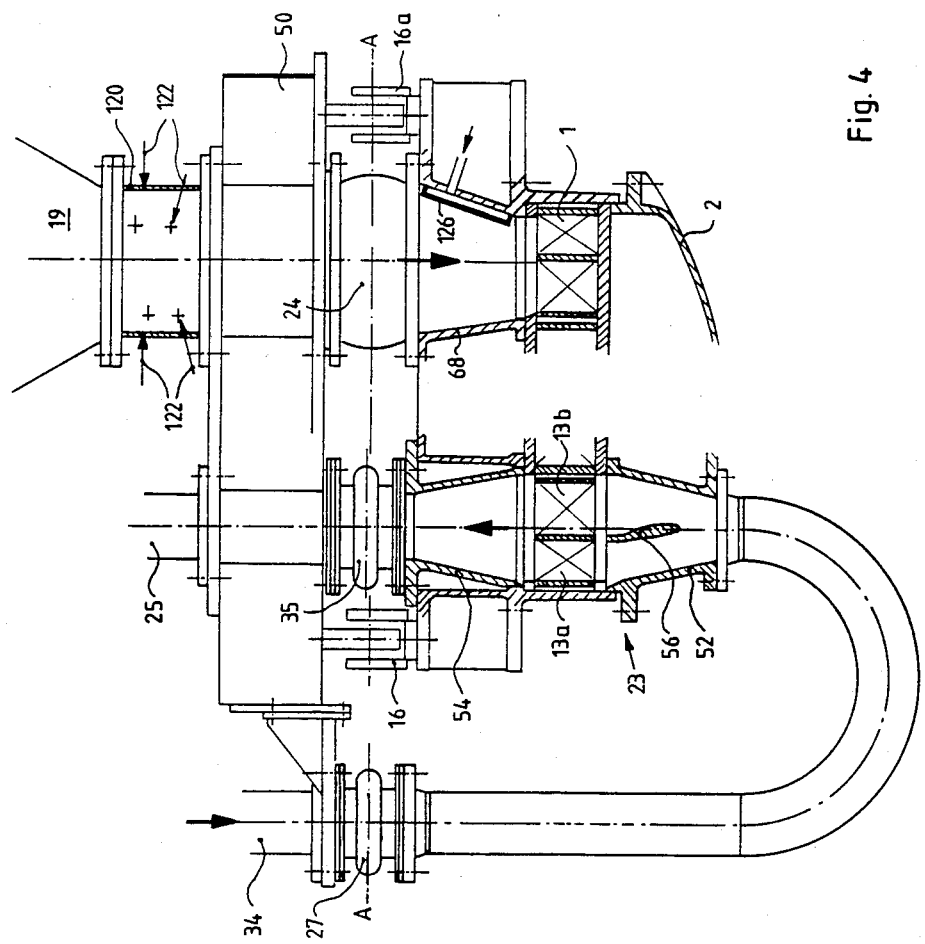

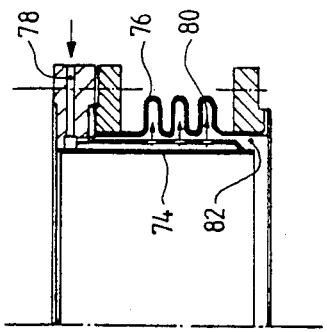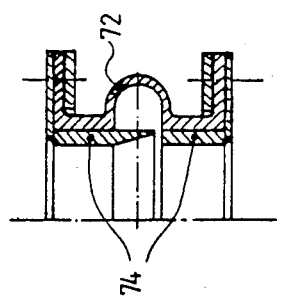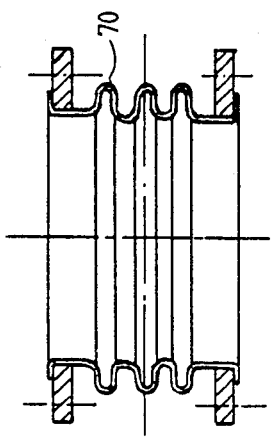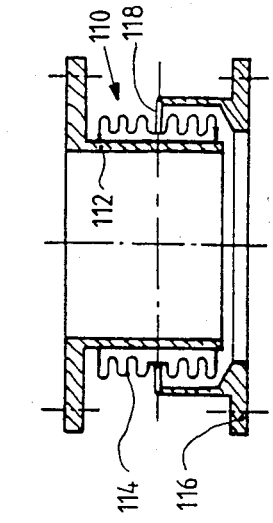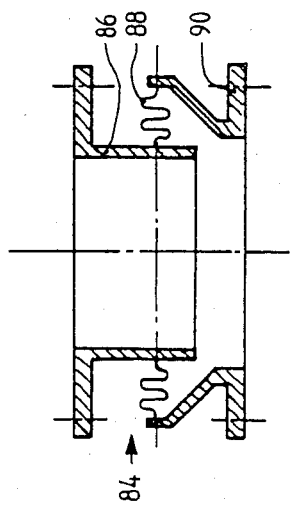

METHOD AND APPARATUS FOR CONTINUOUS GRAVIMETRIC METERING AND PNEUMATIC FEEDING OF POURABLE MATERIAL

FIELD OF THE INVENTION

The invention relates to a method and apparatus for continuous gravimetric metering and pneumatic feeding of pourable material and specifically to an apparatus operating as loop conveyer.

BACKROUND OF THE INVENTION

U.S. Pat. No. 4,528,848 discloses an apparatus of such a type of a loop conveyer. It comprises a housing including a side wall having an essentially cylindrical inner surface, an upper and a lower face wall provided with charging and discharging ports respectively and a rotor mounted in and sealed to the housing for rotation about a vertical axis. The rotor is provided with a plurality of laterally closed pockets. Pourable material, filled into the pockets of the rotor through the charge ports, is conveyed through a measuring path and then discharged through the discharge port. The housing and the rotor are typically fabricated of metal; thus, they have a considerable mass which may be in the order of several hundred kilograms. In comparison, the mass of the pourable material fed through the measuring path is relatively low examplary in the range of several ten kilograms. While the feeding in of material typically is accomplished by means of gravity, the feeding pockets are emptied of material pneumatically. Consequently, there are remarkable differences in pressure, which act as forces or moments, onto the rotor. A further detrimental affect may arise due to variations in temperature, exemplary caused by considerably varying temperatures of the material to be metered. Summing up, the readings derived from the force measuring apparatus are subject to considerably varying affects deteriorating the accuracy of measurements over time.

SUMMARY OF THE INVENTION

In consideration of the above, it is an object of the invention to provide a method and an apparatus as set forth above alleviating the problems indicated before which results in an improved long time accuracy of measurement.

This object is accomplished by a method for operating an apparatus for continuous gravimetric metering and pneumatic feeding of pourable material including a rotor provided with laterally closed feeding pockets and tightly arranged in a housing for rotation about an essentially vertical axis. The housing is provided with a charging station and a discharging station and connections for ducts for connecting a pneumatic feeding system. The housing is hinged for pivotal movement about an essentially horizontal axis at a support means. A force measuring means is connected between the housing and the support means. The method comprises the steps of:

(a) rotating the rotor;
(b) feeding of material into the feeding pockets of the rotor at the charging station;
(c) determining the momentary load caused by the material contained in the feeding pockets while rotating from the charging station to the discharging station;
(d) evaluating the measured momentary load for controlling the amount of material to be fed; and
(e) compensating variations in measured values caused by mechanical and/or thermic influences.

According to the invention an apparatus for continuous metering and pneumatic feeding of pourable material comprises a housing, a rotor having laterally closed feeding pockets and arranged in the housing for rotation about an essentially vertical axis and a charging and a discharging station for feeding material to the feeding pockets and for emptying the feeding pockets are provided with a means for applying air pressure.

A pneumatic system is connected to the discharging station for blowing out material from the feeding pockets. A support means is provided at which the housing is hinged for pivotal movement about an essentially horizontal axis. A force measuring means is connected between the support means and the housing for measuring a momentary load of material contained in the feeding pockets when rotating from the charging to the discharging station. A control means adjusts the amount of fed material to a desired amount depending on the load measured. An adjusting and compensating means eliminates variations in measurement values due to mechanical and thermic influences.

BRIEF DESCRIPTION OF THE DRAWINGS

FIG. 1 is a schematic elevational view of the apparatus according to the invention;

FIG. 2 is a schematic elevational view of the apparatus of the invention seen in the direction of arrow II in FIG. 1;

FIG. 4 is an elevational view of the apparatus of the invention illustrating in particular the arrangement of axis A—A;

FIGS. 6–6e shows various embodiments of elastic coupling means for connecting the apparatus of the invention to various external units without retro-action;

DESCRIPTION OF PREFERRED EMBODIMENTS OF THE APPARATUS OF THE INVENTION

Figure 3:
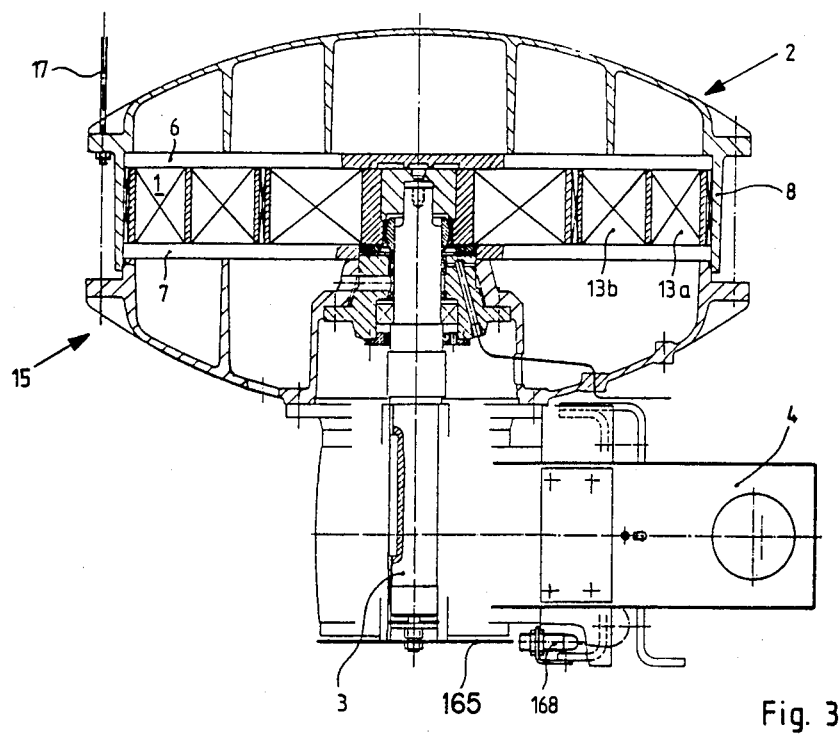
FIG. 3 is a vertical sectional view through the housing and the rotor of the apparatus of FIGS. 1 and 2.
Figure 8:
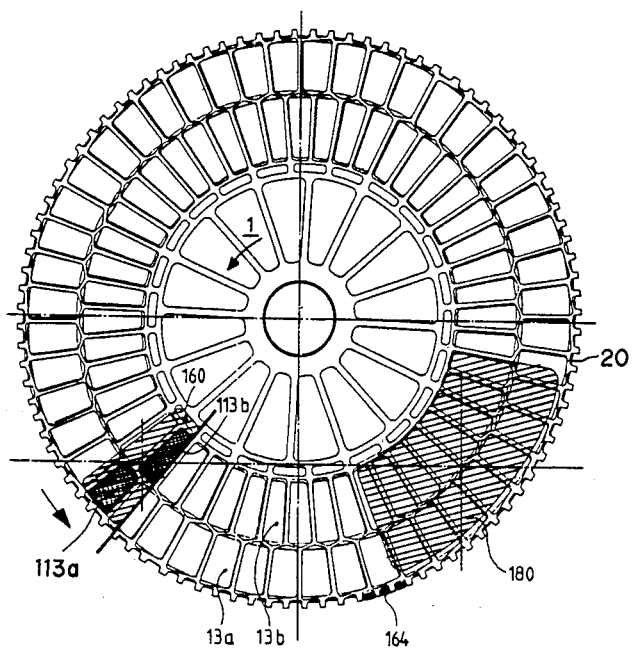
FIG. 8 is a plan view of the rotor of the apparatus according to the invention.

FIGS 1 to 3 show a preferred embodiment of the apparatus 15 of the invention. It should be noted that the principle design of a loop conveyer which is used in connection with the invention has been disclosed in the U.S. Pat. No. 4,528,848. The full contents of this disclosure is made part of the present specification. The apparatus 15 comprises a housing 2 tightly enclosing a rotor 1 (FIG. 3). The rotor 1 is rotatable by means of a rotating shaft 3 driven by a motor/gearing unit 4 connected to the housing 2. The rotor 1 rotates between two sealing plates 6 and 7 arranged in parallel to each other and engaging opposite faces of a cylindrical body 8. The rotor 1 comprises a cylindrical wall 20 (FIG. 8) as well as two groups of feeding pockets 13a, 13b arranged in two concentrical rings and off-set to each other (FIGS. 3 and 8).

The housing 2 is pivotally about axis A—A at positions 16, 16a of frame 50. Furthermore, it is suspended at its left side (FIG. 2) on a rod 17 leading to a force measuring unit 18 provided at the frame 50 (see also FIG. 7).

The material to be metered gravimetrically, for instance coal dust or such alike, is stored in a container 19 provided above the housing 2 and is fed preferably under the influence of gravity through a first elastic coupling 24 and a feed-in element 68 (see also FIG. 4) to the rotor 1.

The emptying of the feeding pockets filled at the charging station is accomplished by blowing out the feeding pockets 13a, 13b (FIG. 3 and 8); for this purpose a pressure duct 34 (FIG. 1) fixed at the frame 50 is connected to the lower port 52 (FIG. 4) of the housing 2 through a second elastic coupling 27. The material blown out of the feeding pockets 13a, 13b is blown into an output duct 25 through an upper port 54 of the housing through a third elastic coupling 35. As may be seen from FIGS. 1 to 4 all three elastic couplings 24, 27 and 35 as well as the hinge positions 16, 16a are positioned on the pivotal axis A—A.

In operation the housing 2 pivots depending upon the amount of material filled into the feeding pockets 13a, 13b slightly about the axis A—A and acts upon the force measuring device 18 in accordance with a corresponding torque moment.

The elastic couplings 24, 27 and 35 provide connections of the housing 2 to the various ducts essentially free of an retroaction. They are attached to the housing at the corresponding ports while on the other hand they are mounted at the frame 50 (see in particular FIGS. 1 and 4).

Figure 5:
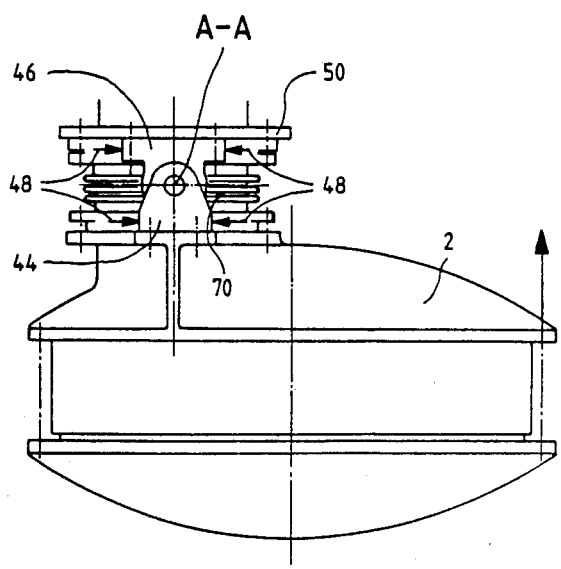
FIG. 5 is an elevational view perpendicular to that of FIG. 4 for explaining the suspension of the housing of the apparatus according to the invention.
Figure 5C:
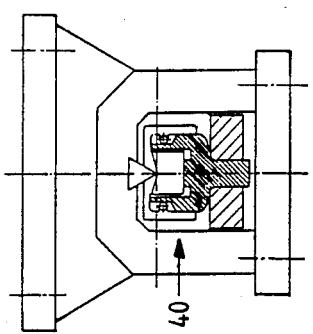
FIGS. 5a–5c show variations alternative for mounting the housing at the frame.
Figure 5B:
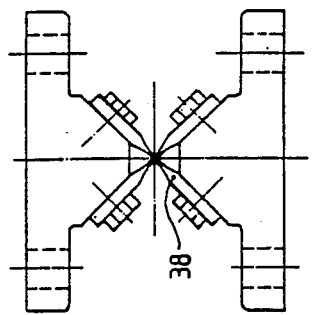
Figure 5A:
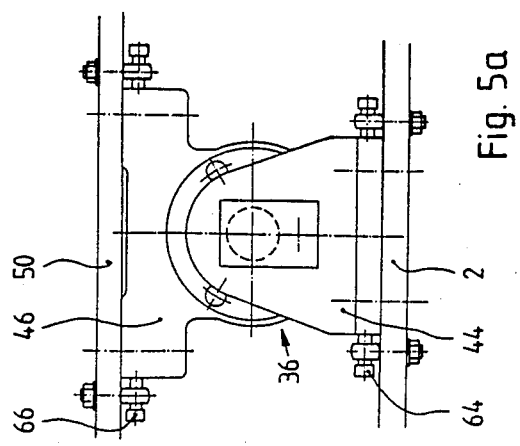

Preferably, the axis A—A extends through the centers of movement of the elastic couplings 24, 27 and 35 and the hinge positions 16, 16a are designed to provide an essentially friction-free pivoting of the housing 2 about the axis A—A. Various alternatives for mounting the housing 2 at the frame 50 are illustrated in principle, in FIGS. 5a to 5c. FIG. 5a shows a roll bearing 36, FIG. 5b a hinge 38 using crossed springs and FIG. 5c a knife bearing 40.

In order to remove any detrimental influences resulting from variations in manufacture and assembly of the housing 2 and the rotor 1 as well as the elastic coupling 24, 27 and 35, it is of importance for an exact metering to exactly position axis A—A. For such an adjustment bearing support members 44, 46 are provided with means to enable a displacement of the bearing support members against the frame 50 and/or the housing 2. FIG. 5, in principle, illustrates such an adjusting means by lateral displacement of the bearing support members 44, 46 in the direction of the arrows 48 in respect of the housing 2 and the frame 50, respectively.

In FIG. 5a one type of adjustment means is illustrated in an examplary form. In particular, adjustment screws 64, 66 are arranged in engagement at the opposite sides of the bearing support members 44, 46.

For compensating any influences of pressure differences at the charging and discharging stations, pressures of different amount are applied to the two stations and the bearings are shifted such that finally no reaction occurs upon pressure variation. Thus, an essential source of error is removed since now the axis A—A extends exactly through the centers of the resulting piston areas effective in the elastic couplings at the charging and discharging stations.

Of great importance for an exact operation of the apparatus according to the invention is the design of the elastic couplings 24, 27 and 35.

In principle, bellow compensators consisting of metal, for instance steel, may be used as indicated by the reference numeral 70 in FIGS. 5 and 6a. With such bellow compensators 70 an asymmetric heating may result in a retro-action affecting a correct reading of the measurement.

A second embodiment of elastic couplings is shown in FIG. 6b, i.e. a bulge compensator 72 made of rubber enforced by a steel net. However, if the material to be metered has higher temperatures there is, at least for a long time, the danger of a burning-through. Therefore, it may be advisable to have arranged a protection tube 74 within the bulge 72. Such a protection tube may consist of two parts between which there is an annular slot for a compensator designed as a blowing-out compensator.

With the feed-in compensator according to FIG. 6c at the charging station a unitary tube 74 is sufficient for the bellow compensator 76. FIG. 6c further shows the preferred provision of blowing duct 78 for avoiding dust depositions at the inner spaces of the bellow compensator 76. The blowing duct 78 may extend close to the inner spaces of the bellows and permits a stream of air through the nozzles 80. The blown-out dust is then conveyed into the main duct of the charging station via a channel 82. A similar blowing-out device may be provided for a compensator at the discharging station according to FIG. 6b where the blowing-out is performed through the annular slot between the two tubes 74.

FIG. 6d shows a further embodiment of a compensator in the form of a diaphragm compensator 84 having an upper part 86 which by a preferably horizontal diaphragm 88 is mounted in a lower part 90. While such a diaphragm compensator 84 is relatively insensitive to temperature changes and there is no danger of burning-through when made of metal, there is a certain pressure dependency which may detrimentally affect the measuring results.

A particularly preferred embodiment of an elastic coupling is the double bellow compensator 110 according to FIG. 6e. With this double bellow compensator 110, a cylindrical upper part 112 is provided at its outer periphery with a bellow 114 preferably made of metal, the upper and lower edges of the bellow 114 being attached to the upper and lower portions, respectively, of the cylindrical upper part 112. A lower part 116, having a similar cylindrical design, is connected to the middle of the bellow 114. Since the upper and lower parts of the bellow 114 have the same spring characteristic, asymmetric heating does not lead to any negative reaction. The space between the outer wall of the cylindrical upper part 112 and the bellow 114 may be filled with liquid which may contribute to an equal temperature distribution. The cylindrical upper part 112 serves as a protection tube for the bellow 114 as well.

Despite the measures, as explaned above, a non-uniform feeding of material from the container 19 to the charging station may lead to a detrimental change in the measuring result (reading). According to the invention, between the lower face of the container 19 and the upper face of the elastic coupling 24, a guide tube 120 is inserted which is continuously filled from the container 19 due to gravity and which, on the other hand, uniformly feeds material to the rotor 1 (see FIGS. 1, 2 and 4).

Supplying of material may be further improved by the application of air through nozzles arranged along the guide tube 120. The nozzles are indicated in FIG. 4. by arrows 122 and avoid a dome formation.

As a further means for uniform supply of material, the introducing or feed-in element 68 may be provided with nozzles 124 as well (FIG. 4). Alternatively, the introducing element 68 may be provided with a sintered wall 126, allowing the blowing-in of air. Also, the application of air in the guide tube and the introducing element 68 results in combination with the air coming from the rotor in a fluidizing of the fed material which will be homogenized.

High temperature variations in the fed material have a detrimental influence to the measuring results. By providing a temperature sensor 150 (FIG. 1) in the region of the material charge station, in particular at the introducing element 68, the current temperature may be determined and may be used for compensating a temperature dependent zero drift and calibration when evaluating the measurement results as described below.

Vibrations and shock-pulses which may occur in the neighborhood of the apparatus may affect the measurement of the momentary load. Therefore, for reducing such shocks, the force measuring device 18 is provided with an attenuation member. According to FIG. 7, this may be a hydraulic attenuation member 81 which acts upon the lever 152 in the force-measuring device 18. The hydraulic attenuation member 81 comprises a housing 154 containing liquid 156 in which a piston 158 is moved. The piston 158 has a large area and is a small peripheral distance from the inner surface of the housing.

Figure 10:
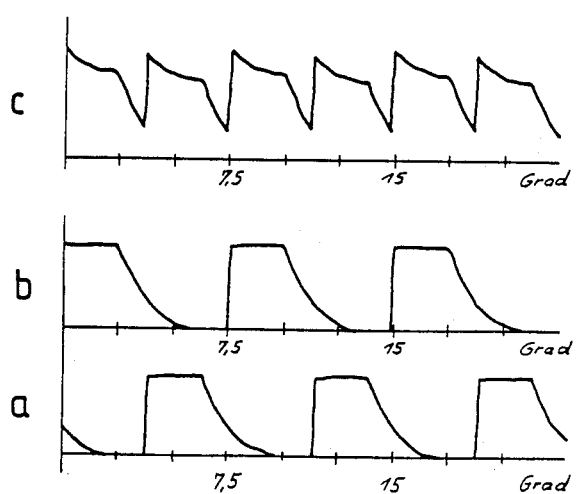
FIG. 10 is a pulse diagram for explaining the compensating operation of the rotor according to FIG. 9.

In order to perform a measurement as free of retroaction as possible, it is important to design and arrange the rotor 1 properly. As shown, in FIG. 8, the rotor 1 is provided with several concentric rings of feeding pockets i.e., according to the preferred embodiment with two concentric rings of feeding pockets 13a and 13b, where the feeding pockets of the two rings are offset to each other. Thus, there is a more uniform emptying of the feeding pockets 13a, 13b at the discharging station by application of air pressure. In FIG. 8 the hatched area 160 represents the cross-section of the discharging opening, while in FIG. 4, the lateral sectional view of the discharging station is illustrated. FIG. 8, shows clearly that two feeding pockets 113a and 113b are with their total areas in the region of the discharging opening 160 in the momentary position of the rotor 1. FIG. 4, shows a stream splitter 56 distributing the air stream to the inner and outer feeding pockets 13a, 13b. The offsetting of the feeding pockets and the whirl-free splitting of the air stream avoid any pulsation during the blowing out of the material of the feeding pockets at the discharging station. FIG. 10, illustrates this improvement. The pulses shown in lines a and b represent the pulsation, i.e. the momentary pressure situation for each of the two concentric rings of feeding pockets at the discharging station. By these measures, according to the invention, the pressure distribution according to line c results in a considerably more uniform feeding material which in many applications is desired or even necessary. The unbalance of the rotor 1 may influence the measuring results, too. This unbalance may be removed by mechanical means for instance by applying balance masses 164 (FIG. 8) or the unbalance may be compensated electronically. FIG. 3 indicates two alternative solutions. The first alternative of an electronic compensation of the unbalance of the rotor 1 consists in that the angular position of the rotor 1 is indicated by a mark or switching flag 165 attached to the lower end of the rotor shaft 3. The switching flag causes the generation of a pulse in a sensor 168 upon each revolution of the rotor 1. The pulses are transmitted to the electronic evaluation unit 200 of the apparatus of the invention. For determining the influence of the unbalance of the rotor 1, the latter is rotated empty or uniformly filled. The influence of the unbalance onto the measuring result is thus determined and corresponding correction values are stored. The switching flag 165 may be replaced by a gear rotating with the rotor. The teeth of the gear caused pulses in a sensor for a digital measuring device known per se, in particular a counter. Thus, momentary angular position is represented by the contents of the counter and may be related to the momentary load values. The switching flag and the digital measuring device may be used together.

It should be noted, that the dividing of the feeding pockets into two concentric rings enables the splitting of feed-out duct 25 (FIG. 1) at the discharging station. This offers the possiblity of a volumetric distribution of metered material to two or more user stations. In this case each concentric ring has associated therewith a separate feed-out duct 25.

Figure 7:
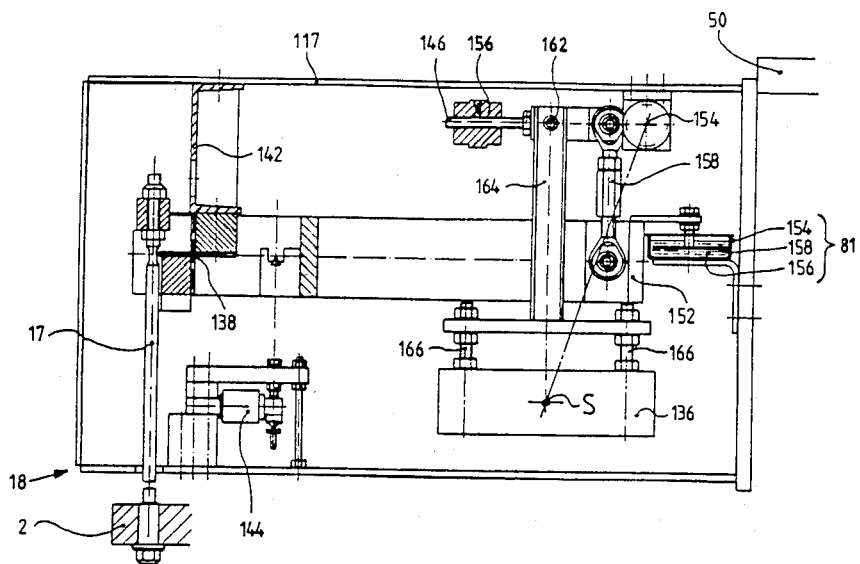
FIG. 7 shown a force measuring device provided with a compensation means for a shift of the center of gravity in connection with the use of the apparatus according to the invention.

The adjustment of the exact position of the pivotal axis A—A running through the center of movement of the elastic couplings in connection with the position of the center of gravity determined by the large mass of the housing and the rotor, may cause a zero drift even upon a very small displacement in the relative position between the housing, the rotor and the frame in view of an initial section or a temperature related displacement of position, which result in an angular displacement of the center of gravity of the total apparatus 15 about the pivotal axis A—A. FIG. 2 shows this situation in principle. The center of gravity 130 may change its position in view of the variations mentioned before. Two positions 132 and 134 ar shown in an exaggerate form; to remove this effect in force measuring device 18, a compensation means is arranged including a pendulum mass 136. FIG. 7, shows this compensation means in more detail. The rod 17 having one of its ends connected to the housing 2 extends through a hole in a housing 117 of the force measuring device 18 and has its other end pivotally connected to the lever 152. This lever 152 is pivotally mounted at a bar 142 arranged in the housing 117 preferably by a crossing spring hinge. A force measuring cell 144 is provided in spaced relationship to the pivotal axis 138 and acts upon the lever 152 by means of a knife bearing. The force measuring cell may be of any known type, exemplary a strain guage. For equalizing the force exerted onto rod 17 by the housing 21 mounted asymmetrically in relation to axis A—A, a canti-lever 146 is pivotally mounted at a point 154 while its free end is provided with a shiftable weight 156. A longitudinally adjustable arm connects the canti-lever 146 to that end of the lever 152 distant from the rod 17, the attenuation means 81 being fixed to that end.

By means of a lever 164, the pendulum mass 136 is supported and is pivotable about a horizontal axis 162 and adjustable in height by means of screws 166. The connection between point 154 and the center of gravity S of the pendulum mass 136 extends parallel to the connection of the axis A—A with the center of gravity 130 of the apparatus 15. Thus, displacement of the frame 50 out of its horizontal position has a similar effect to the apparatus 15 and to the pendulum mass 136 (see also FIG. 2).

Figure 9:
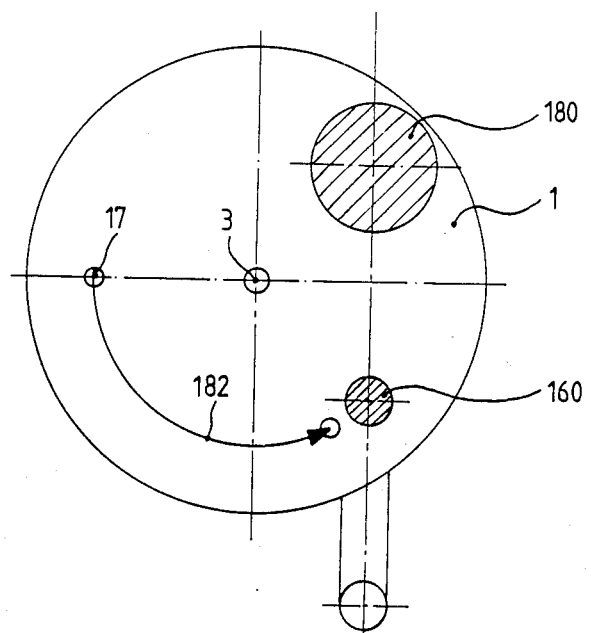
FIG. 9 is a plan view of the rotor of the apparatus according to the invention, in principle.

Finally, FIG. 9 shows, in principle, a further improvement for uniform metering of pourable material with the rotor 1, the charge opening 180 and the discharge opening 160 (see also FIG. 8), as well as the point of attachment of the rod 17 of the force measuring device 18 at the housing, as well as the rotor shaft 3. As indicated by the arrow 182, between the time of metering of the material contained in the rotor and the time when a momentary measuring value becomes effective in regulating the angular speed of the rotor, there is a delay which causes a transmission of the momentary measuring value only immediate before the corresponding feeding pocket arrives at the discharging station. Thus, if there is a change necessary in angular speed, such a change is performed just at the right time.

FIG. 2, shows an alternative solution for compensating a center of gravity shift of the apparatus 15. At the housing 2 preferably at its upper side and as close as possible to the center of gravity of the apparatus 15, an inclination measuring device 210 is provided. This device may comprise exemplary a pendulum acting upon a differential transformer generating a differential signal in dependence on the inclination of the pendulum. The signal will be used for an electronic compensation of a center of gravity shift for the evaluation of the measuring values.

In operation there may occur a zero drift or a drifting in calibration due to wear or other mechanical or temperature influences. Such drifts affect the absolute accuracy and reproductibility of the apparatus. Typically, it was therefore necessary to interrupt the operation from time to time in order to check the zero adjustment and to correct it, if necessary. Such an interruption of operation is undesirable in continuously working industrial systems as concrete burning systems, heating systems or the like.

Thus, the invention provides a method for determining and, if necessary, compensating of a zero drift, which method may be performed with the system in operation where the continuous stream of fed material in interrupted only for such a short time period, that the total system maintains a proper operation.

For this purpose the direction ot rotation of the rotor 1 is momentarily reversed (see FIG. 9). The feeding pockets filled at the charging station 180 move in a clockwise direction only over the short distance between the charging and discharging station. The current moment measured by the force measuring device 18 or current temperature measured by the temperature sensor 150 is then mathematically related to the moment or temperature which was measured during feeding of material in the normal operational direction of rotation with the same speed. The resulting relation may be used for determining, whether there has been a zero drift or not.

Before, starting operation of an apparatus according to the invention, various relationships or ratios may be determined and stored by performing test runs of the differently loaded rotor 1 in the one and the opposite direction of rotation preferably at different speeds. The resulting ratios are then stored in a digital memory and used for comparison during operation and apparatus.

In operation, if a deviation of a stored predetermined ratio and a momentarily determined ratio is determined, the difference may be used for correcting a zero drift. Such a correction may be accomplished by correcting the amount of fed material. Alternatively, the amount and direction of zero drift may be indicated and displayed for manual correction. This method of correction may be initiated from time to time manually. Preferably, the system may be designed such that in predetermined periods of operation the method is initiated automatically.

This method for monitoring the zero setting may also be used for monitoring and eventual correcting of the calibration by loading the force measuring device in a well-known manner with weights and comparing the measured results with a stored calibration characteristic.

I claim:

1. A method for ensuring proper operation of an apparatus for continuous gravimetric metering and pneumatic feeding of pourable material, including a rotor provided with laterally closed feeding pockets and tightly arranged in a housing for rotation about an essentially vertical axis, said housing being provided with a charging station and a discharging station and connections for ducts for connecting a pneumatic feeding system, and being hinged for pivotal movement about an essentially horizontal axis at a support means, and a force measuring means is connected between said housing and said support means and to an evauation means for controlling the angular speed of said rotor, said method comprising the steps of:
   rotating said rotor;
   applying varying pressure at said charging station and said discharging station:
   determining any unbalance of said rotor; and
   adjusting and fixedly securing the position of said essentially horizontal axis in respect of said support means based upon the determined unbalance of said rotor.

2. The method of claim 1 wherein determining electronically any unbalance of said rotor and any residual unbalance after adjusting said essentially horizontal axis is electronically equalized in said evaluation means.

3. The method of claim 1 further comprising the steps of determining the temperature of material fed through said charging station; and
   using said temperatures measured for compensating of any temperature changes in evaluating said measured values of material fed through said rotor.

4. The method of claim 1 further comprising the step of ensuring uniform feeding of material at said charging station to said rotor.

5. A method for ensuring proper operation of an apparatus for continuous gravimetric metering and pneumatic feeding of pourable material, including a rotor provided with laterally closed feeding pockets and tightly arranged in a housing for rotation about an essentially vertical axis, said housing being provided with a charging station and a discharging station and connections for ducts for connecting a pneumatic feeding system, and being hinged for pivotal movement about an essentially horizontal axis at a suport means, and a force measuring means is connected between said housing and said support means and to an evaluation means for controlling the angular speed of said rotor, said method comprising the steps of:

rotating said rotor in a first direction;

feeding of material into said feeding pockets of said rotor at said charging station; determining the momentary load caused by material contained in the feeding pockets while rotating from said charging station to said discharging station;

momentarily reversing the direction of rotation of said rotor;

determining said momentary load caused by said material fed from said station to said discharging station;

relating said load measured with said rotor rotating in said first direction to said load measured with said rotor rotating in said reverse direction; and evaluating the result of said relationship for determining a value of one of a zero shift and a calibration shift, said evaluation being done in the evaluation means; and compensating any determined value in said evaluation unit.

6. An apparatus for continuous metering and pneumatic feeding of pourable material comprising:

a housing;

a rotor having laterally closed feeding pockets and arranged in said housing for rotation about an essentially vertical axis;

a charging and a discharging station for feeding material to said feeding pockets and for emptying said feeding pockets;

a pneumatic system connected to said discharging station for blowing out material from said feeding pockets;

a support means at which said housing is hinged for pivotal movement about an essentially horizontal axis;

a force measuring means connected between said support means and said housing for measuring a momentary load of material contained in said feeding pockets when rotating from said charging station to said discharging station elastic coupling means provided between said housing and a charging means and said connections to the pneumatic feeding system, all elastic coupling means are arranged on said essentially horizontal axis such that centers of movement extend through said elastic couplings;

bearings supporting said housing on said support means for essentially frictionless pivotal movement about said essentially horizontal axis;

adjustable support members supporting said bearings and for finely adjusting and exactly securing the position of said housing in respect of said support means, such that with said rotor in rotation any unbalance thereof is equalized;

unbalance detecting means associated with said rotor for detecting any unbalance thereof when in rotation;

evaluation means connected to said force measuring means and said unbalance detecting means for controlling an angular speed of said rotor and to electronically equalize any residual unbalance.

7. The apparatus of claim 6 wherein said bearings are selected from role bearings, knife bearings and cross spring hinge bearings.

8. The apparatus of claim 6 wherein said support members are adjustable by adjusting screws.

9. The apparatus of claim 6 wherein said elastic couplings are selected from the group of bellow compensators, bulge compensators and diaphragm compensators.

10. The apparatus of claim 6 or 9 wherein a protection tube is provided within said elastic couplings.

11. The apparatus of claim 6 or 9 wherein there are provided blowing means connected to the interiors of said elastic couplings.

12. The apparatus of claim 9 wherein said diaphragm compensator comprises a cylindrical upper member, a base member of larger diameter than the upper member and a diaphragm extending essentially horizontally and connecting said upper member to base member.

13. The apparatus of claim 9 wherein said bellow compensator comprises a cylindrical upper member, a cylindrical base member having a larger diameter than the upper member and a bellow means extending along the exterior peripheral surface of said upper member having its opposite face ends connected to said peripheral surface and being peripherally connected at a central position to an upper face edge of said base member which encloses a lower half of said bellow.

14. The apparatus of claim 13 wherein a space between said cylindrical upper part of said bellow compensator and said bellow is filled with a fluid.

15. The apparatus of claim 9 wherein between said elastic coupling at said charging station and said rotor there is arranged a charging member with an essential area of its wall being provided with means for applying air pressure.

16. The apparatus of claim 15 wherein a said means for applying air pressure is an air permeable wall formed of sintered material.

17. The apparatus of claim 6 wherein at said charging station there is provided a charging chamber formed as a tube.

18. The apparatus of claim 17 wherein said charging chamber is provided with nozzles distributed over an essential area of surface of said charging chamber.

19. The apparatus of claim 6 where adjacent to said charging station there is arranged a temperature sensor means connected to said evaluation means for temperature compensation, said evaluation means including memory means for storing reference values and processing means for selecting predetermined reference values dependent on the temperature sensed by said temperature sensor means said selected predetermined reference value being used for compensating one of a temperature-dependent zero shift and a calibration shift.

20. The apparatus of claim 6 wherein there is provided a center of gravity drift recogntition means.

21. The apparatus of claim 20 wherein a said center of gravity drift recognition means is an inclination recognition means arranged at said housing in juxtaposition to the centre of gravity of said housing.

22. The apparatus of claim 20 wherein said center gravity drift recognition means is incorporated in said force measuring device.

23. The apparatus of claim 6 wherein said evaluation means further comprises a delay means causing a delay between the time of receipt of a measuring value corresponding to a momentary amount of material conveyed by said rotor, by said evaluation means to a time for effecting a change, in the angular speed of said rotor.

24. The apparatus of claim 6, further comprising means for temporary reversing said direction of rotation of said rotor, said evaluation means including means for mathematically relating momentary values measured by said force measuring means with the rotor rotating in said first direction to those with the rotating in said reverse direction for determining said value of one of zero shift and calibration shift.

25. The apparatus of claim 6, wherein said means for detecting an unbalance of said rotor includes means for determining and indicating the momentary angular positions of said rotor in respect of said housing, said evaluation means including memory for storing values indicating any unbalance associated to corresponding of said momentary angular positions, said unbalance values being used for electronically compensating any unbalance of said rotor, when in rotation.

26. The apparatus of claim 6, wherein at said charging station there is provided a means for uniforming supply of material at said charging station to said rotor.

27. The apparatus of claim 6 further comprising an attenuation means associated to the force measuring means for absorbing any shocks and short time changes during operation of the apparatus.

28. The apparatus of claim 6 wherein said rotor has said feeding pockets arranged in two concentric rings, said feeding pockets of one of said rings being offset to said feeding pockets of the other of said rings.

* * * * *